(12) United States Patent
Lu

(10) Patent No.: US 7,628,257 B1
(45) Date of Patent: Dec. 8, 2009

(54) HYDRAULIC DAMPER FOR DRAWER

(75) Inventor: Chun-Min Lu, Taipei Hsien (TW)

(73) Assignee: KV IP Holdings Ltd, George Town, Grand Cayman (KY)

( * ) Notice: Subject to any disclaimer, the term of this patent is extended or adjusted under 35 U.S.C. 154(b) by 0 days.

(21) Appl. No.: 11/978,558

(22) Filed: Oct. 30, 2007

Related U.S. Application Data

(63) Continuation-in-part of application No. 11/812,246, filed on Jun. 15, 2007, now abandoned.

(51) Int. Cl.
*F16F 13/00* (2006.01)
(52) U.S. Cl. .............. 188/282.6; 188/282.5; 188/322.15
(58) Field of Classification Search .............. 188/282.6, 188/282.5, 282.1, 322.15, 322.17, 282.8, 188/317, 322.13, 322.14, 283; 92/172, 181 R, 92/181 P; 137/493.8, 614.16, 614.18
See application file for complete search history.

(56) References Cited

U.S. PATENT DOCUMENTS

| | | | | |
|---|---|---|---|---|
| 2,953,810 A | * | 9/1960 | Hall | 16/52 |
| 3,844,389 A | * | 10/1974 | de Carbon | 188/322.15 |
| 3,937,450 A | * | 2/1976 | Bauer | 267/113 |
| 4,467,899 A | * | 8/1984 | Molders et al. | 188/320 |
| 4,510,752 A | * | 4/1985 | Gaiser | 60/562 |
| 4,736,824 A | * | 4/1988 | Dony et al. | 188/322.17 |
| 4,830,152 A | * | 5/1989 | Rauert et al. | 188/322.15 |
| 5,259,294 A | * | 11/1993 | May | 92/181 P |
| 5,579,874 A | * | 12/1996 | Jeffries et al. | 188/282.9 |
| 5,855,258 A | * | 1/1999 | Deferme | 188/282.6 |
| 6,247,563 B1 | * | 6/2001 | De Carbon et al. | 188/282.5 |
| 2003/0132072 A1 | * | 7/2003 | Sawai et al. | 188/281 |

FOREIGN PATENT DOCUMENTS

JP 2005-16691 A * 1/2005

* cited by examiner

*Primary Examiner*—Robert A Siconolfi
*Assistant Examiner*—Mariano Sy
(74) *Attorney, Agent, or Firm*—Jackson IPG PLLC

(57) ABSTRACT

A hydraulic damper includes a cylinder holding a hydraulic fluid, a piston rod movable in and out of the cylinder, a rigid valve block coupled to the piston rod and having equiangularly spaced through holes, a piston coupled to the piston rod and having a plurality of axially extending through holes, a number of the through holes of the piston being respectively aimed at the through holes of the rigid valve block for allowing the hydraulic fluid to pass through the piston in one direction at a high speed during outward stroke of the piston rod and to pass through the piston in the other direction at a low speed during inward stroke of the piston and a plurality of spring strips for stopping against the rigid valve block, and a cushion block that buffers the impact of the rigid valve block when the piston rod is extended out of the cylinder.

8 Claims, 10 Drawing Sheets

HYDRAULIC DAMPER FOR DRAWER

CROSS-REFERENCE OF RELATED APPLICATION

The present invention is a continuation-in-part of HYDRAULIC DAMPING DEVICE FOR DRAWER of application Ser. No. 11/812,246, filed on Jun. 15, 2007 now abandoned.

BACKGROUND AND SUMMARY OF THE INVENTION

The present invention relates to damping devices and more particularly, to a hydraulic damper for drawer, which buffers return stroke of the piston rod, allows quick forward stroke of the piston rod without much resistance, and absorbs shocks and reduces noises during reciprocating movement of the piston rod with the drawer.

U.S. Pat. No. 6,615,450B2 discloses an apparatus for the damping of impacts, preferably the impacts of furniture doors or drawers. According to this design, a compression spring is used to impart a damping resistance to the furniture drawer as the piston rod is moved to the inside of the cylinder. When the piston rod is extending out of the cylinder, the tube-section-like part of the compression spring is compressed to absorb shocks, lowering the noise level. However, because the compression spring has a certain length, it may cause an unsmooth movement of the piston rod.

The present invention has been accomplished under the circumstances in view. It is one object of the present invention to provide a hydraulic damper for drawer, which imparts a high damping resistance to the piston rod as the piston rod is moved toward the inside of the cylinder, smoothening the return stroke of the piston rod.

It is another object of the present invention to provide a hydraulic damper for drawer, which allows the piston rod to be extended out of the cylinder at a high speed without much resistance and, which absorbs chocks and reduces noises during movement of the piston rod.

It is still another object of the present invention to provide a hydraulic damper for drawer, which uses a less number of parts to achieve shock-absorbing and noise-reducing functions.

To achieve these and other objects of the present invention, the hydraulic damper comprises a cylinder holding a hydraulic fluid, a piston rod moving in and out of the cylinder and having a pin at one end inside the cylinder, a rigid valve block affixed to the inner end of the pin of the piston rod and having equiangularly spaced through holes, a retainer affixed to the outer end of the pin of the piston rod, a piston coupled to the pin of the piston rod and movable along the pin between the rigid valve block and the retainer and having a plurality of axially extending through holes, a number of the through holes of the piston being respectively aimed at the through holes of the rigid valve block for allowing the hydraulic fluid to pass through the piston in one direction at a high speed during outward stroke of the piston rod and to pass through the piston in the other direction at a low speed during inward stroke of the piston, and a shock absorber that buffers the impact of the rigid valve block when the piston rod is extended out of the cylinder. Further, a cushion block is mounted inside the cylinder near the rear cap for buffering the impact when the piston rod is extended out of the cylinder at a high speed.

DETAILED DESCRIPTION OF THE INVENTION

Figure 1:
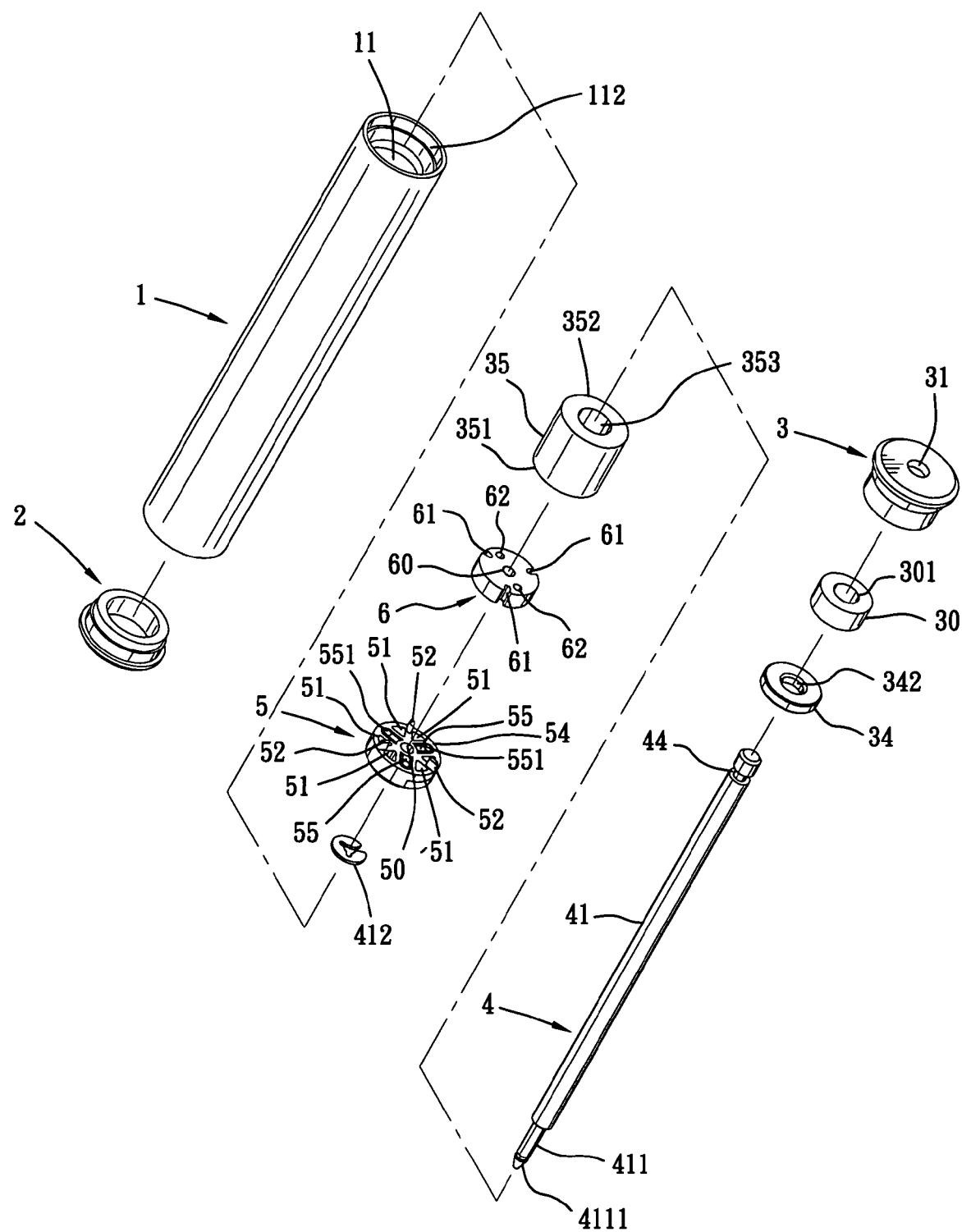
FIG. 1 is an exploded view of a hydraulic damper for drawer according to the present invention.
Figure 2:
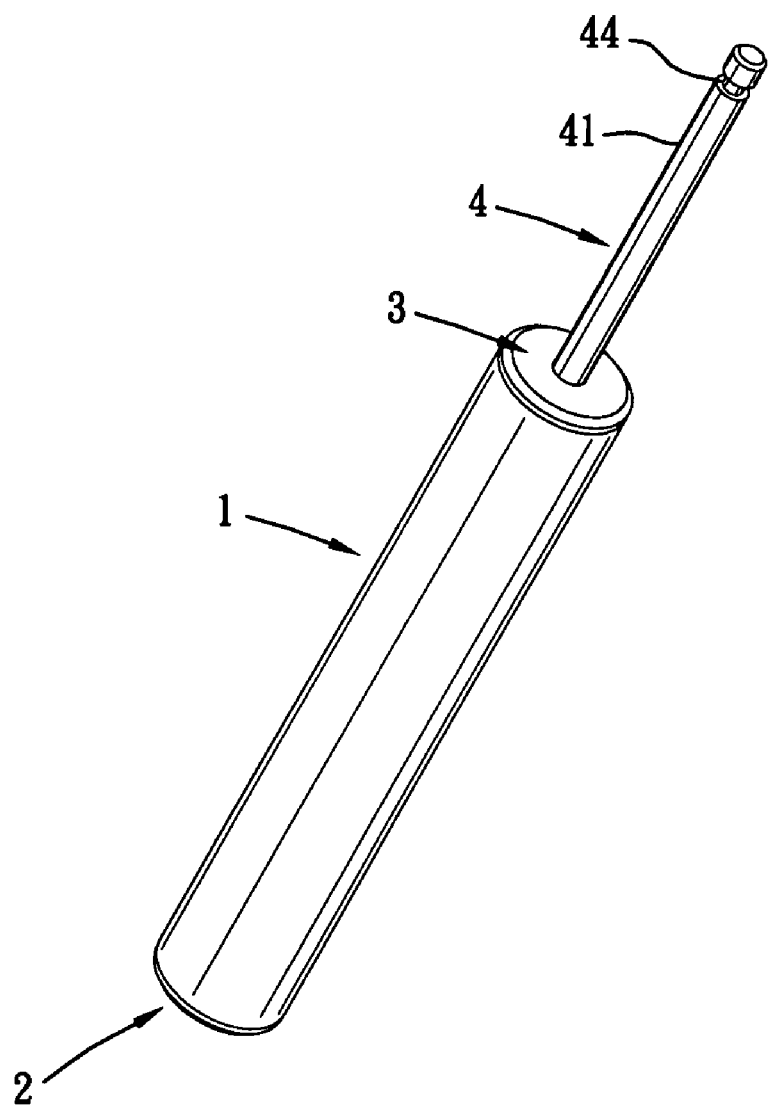
FIG. 2 is an elevational assembly view of the hydraulic damper for drawer according to the present invention.

Referring to FIGS. 1~10, a hydraulic damper for drawer in accordance with the present invention is shown comprised of a cylinder 1, a front cap 2, a rear cap 3, a piston rod 4, a piston 5, and a rigid valve block 6.

The cylinder 1 has a cylindrical peripheral wall 11 in which the piston 5 is moved forwards/backwards with the piston rod 4, a front opening 111 defined in one end of the cylindrical peripheral wall 11 (see FIG. 5), and a rear opening 112 defined in the other end of the cylindrical peripheral wall 11.

Figure 3:
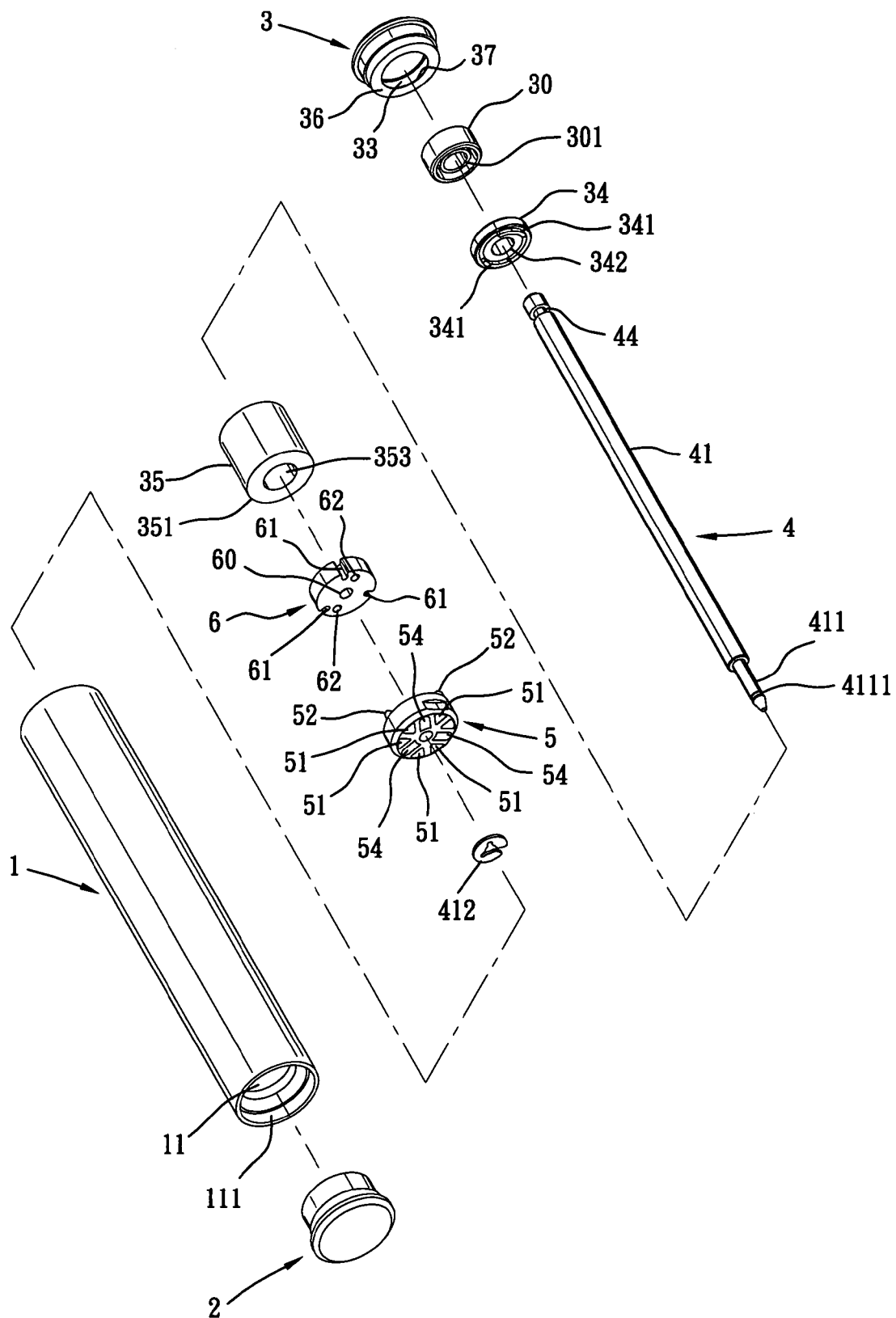
FIG. 3 corresponds to FIG. 1 when viewed from another angle.
Figure 4:
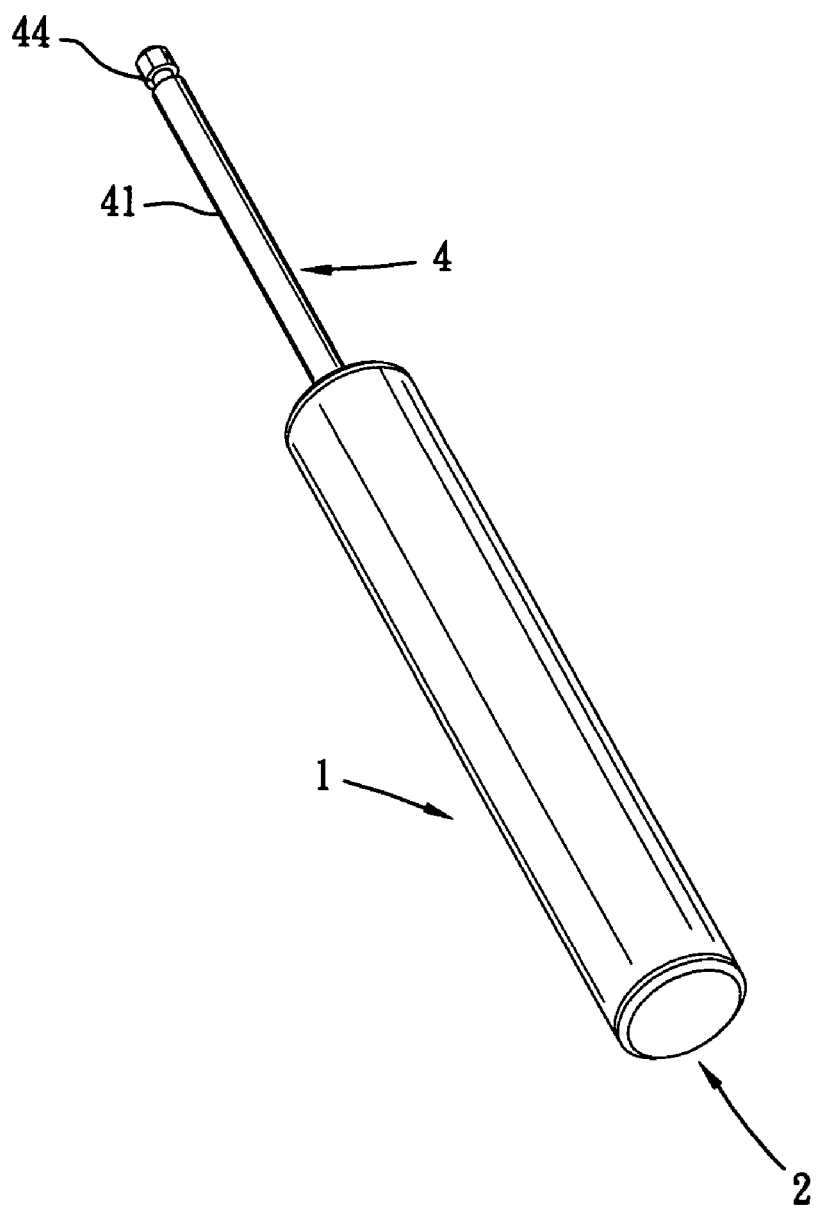
FIG. 4 corresponds to FIG. 2 when viewed from another angle.
Figure 5:
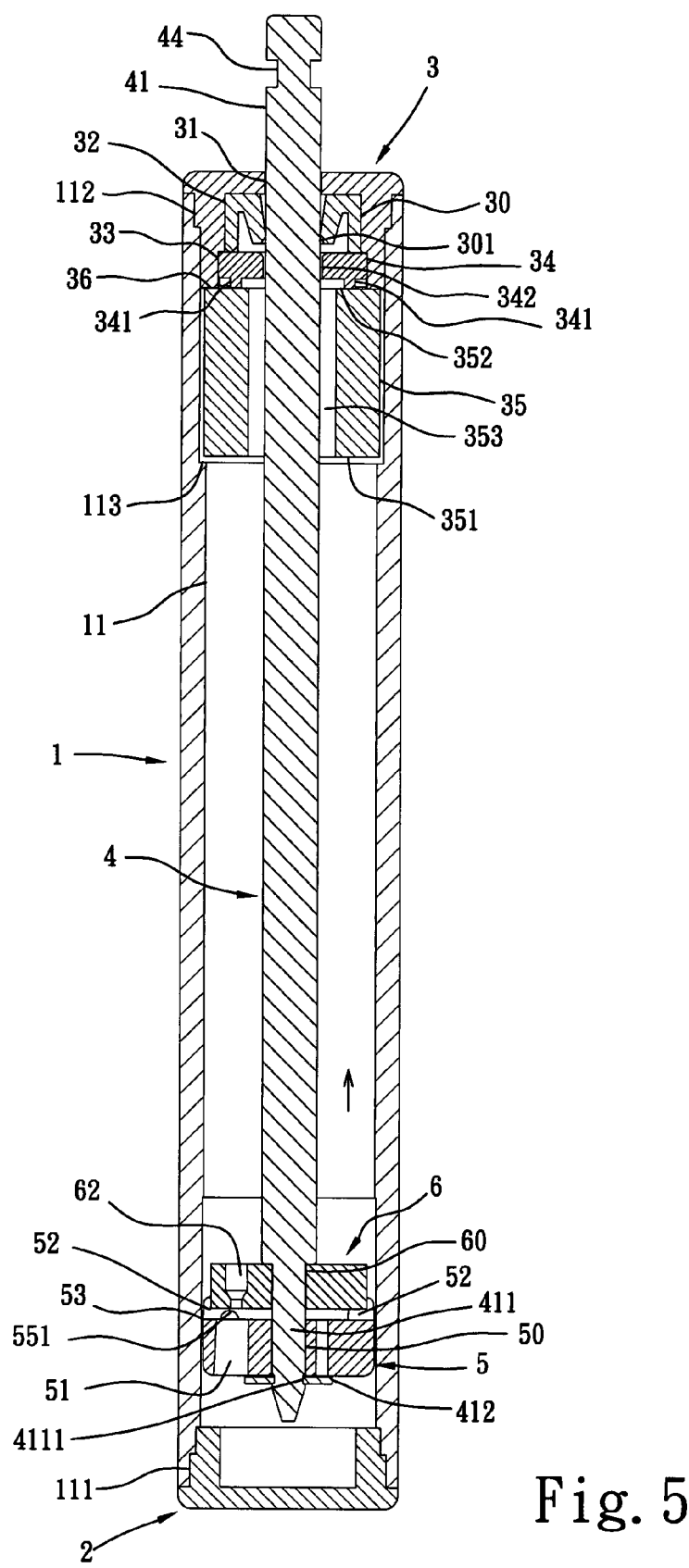
FIG. 5 is a sectional view of the present invention, showing a gap left between the rigid valve block and the piston.
Figure 6:
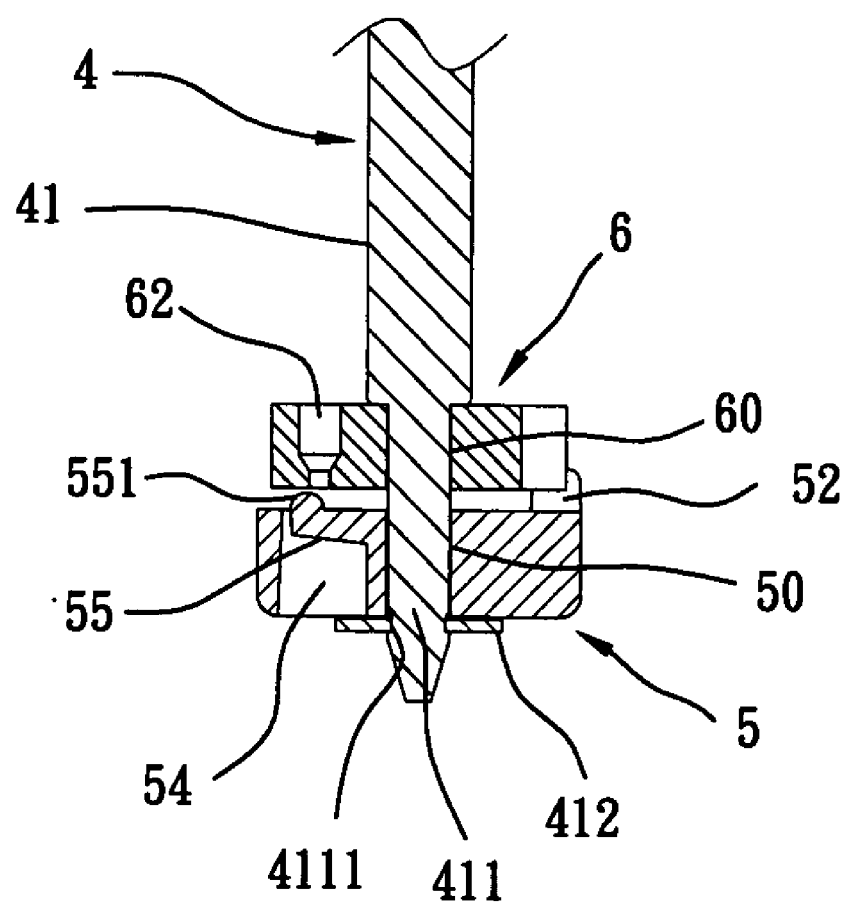
FIG. 6 is a sectional view of a part of the present invention, showing a gap left between the rigid valve block and the piston.
Figure 7:
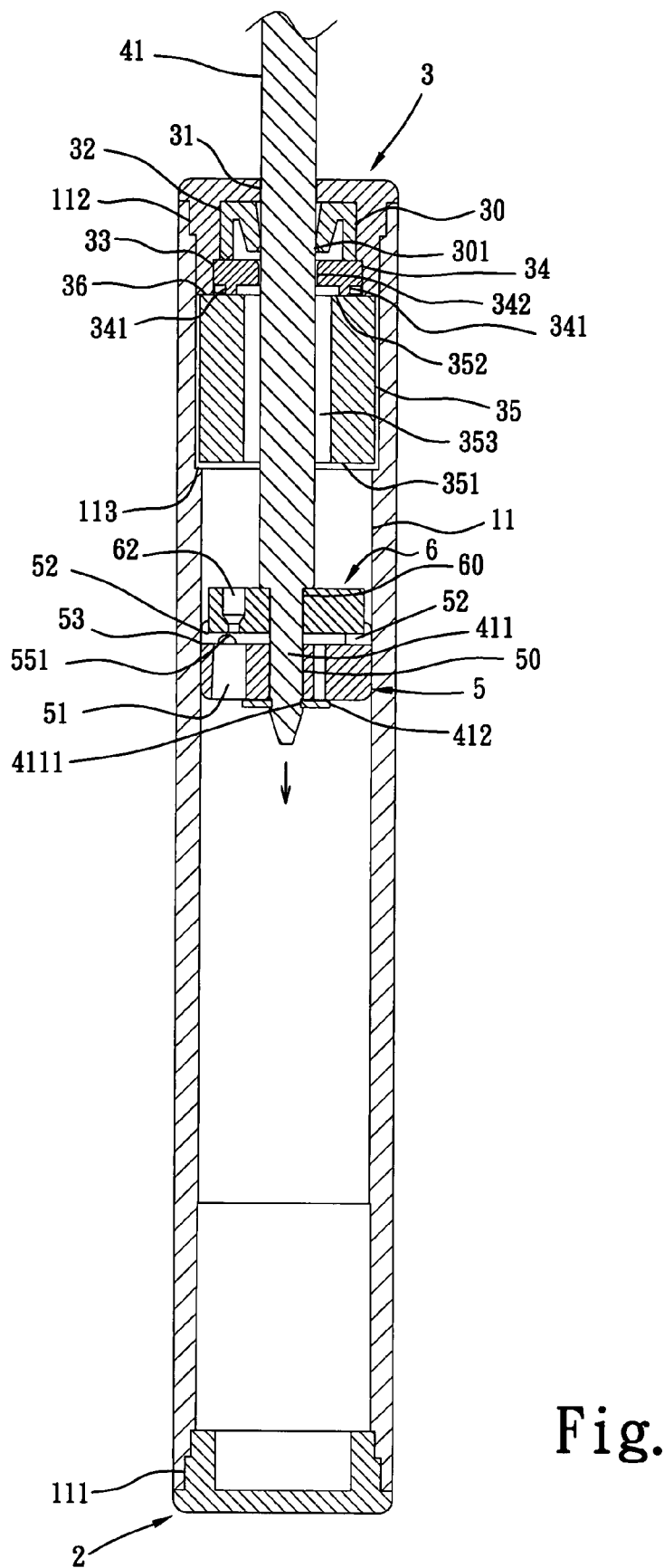
FIG. 7 is a sectional view of the present invention, showing the piston stopped against the rigid valve block.
Figure 8:
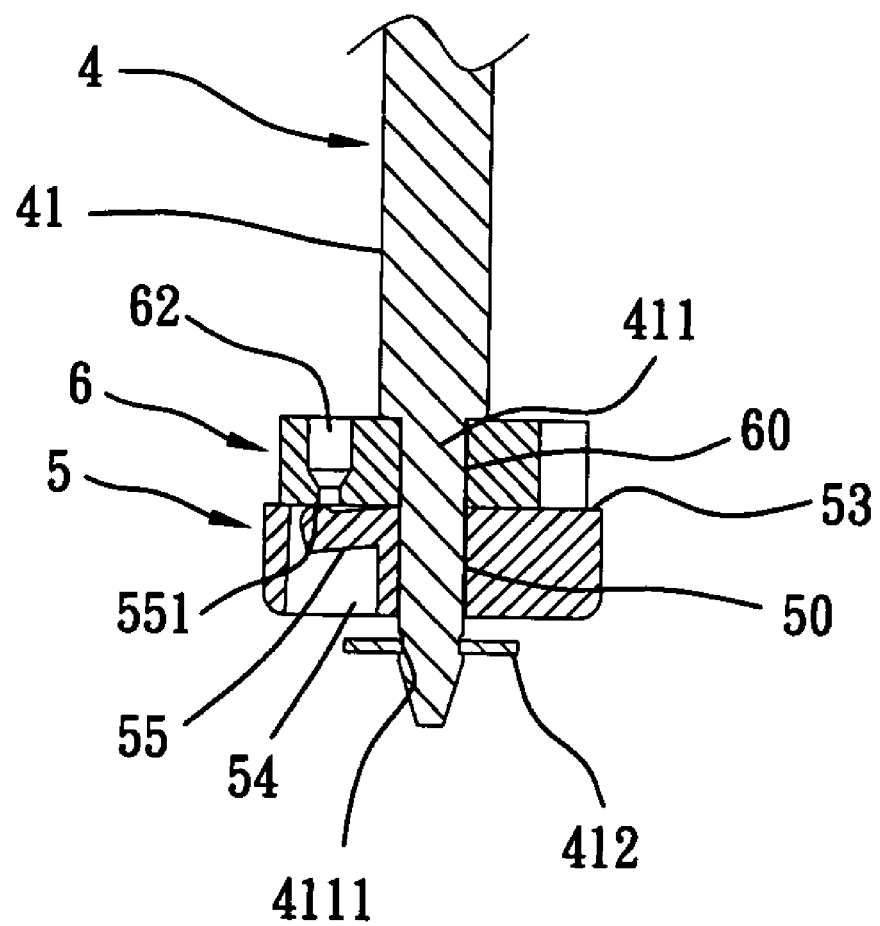
FIG. 8 is a sectional view of a part of the present invention, showing the piston abutted against the rigid valve block.
Figure 9:
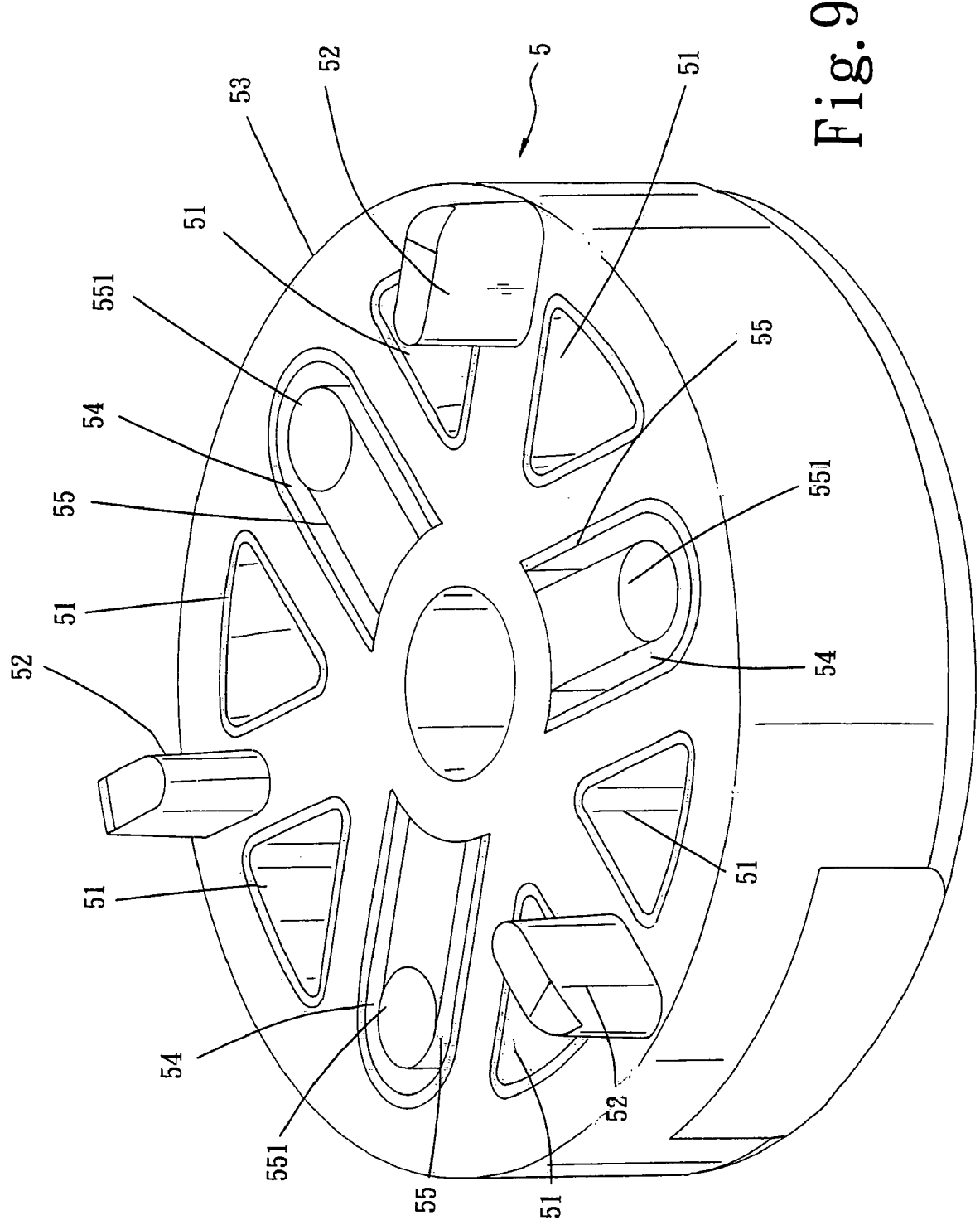
FIG. 9 is an elevational view in an enlarged scale of the piston of the hydraulic damper for drawer according to the present invention.
Figure 10:
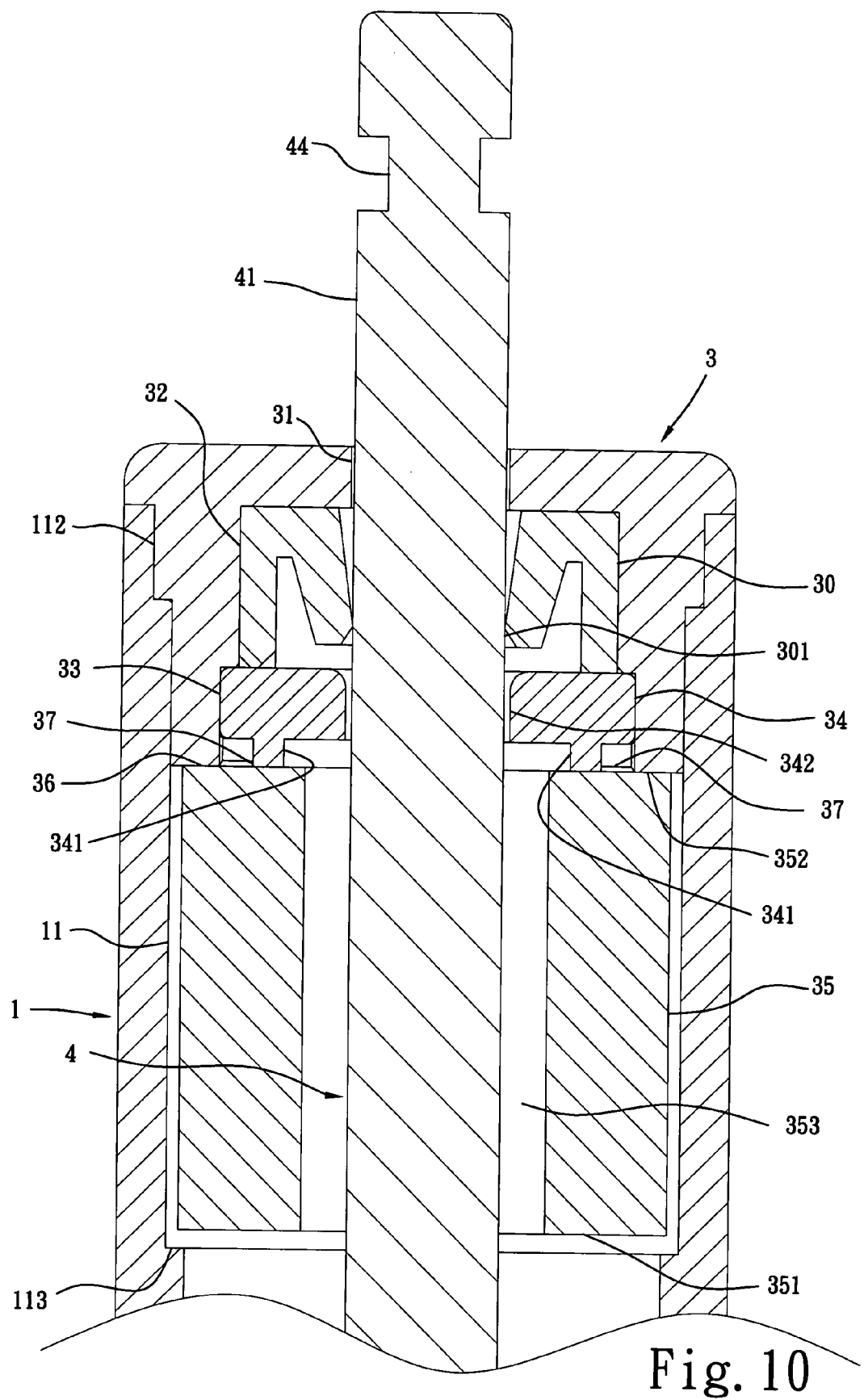
FIG. 10 is a sectional view in an enlarged scale of a part of the hydraulic damper for drawer according to the present invention.

The front cap 2 is sealed to the cylindrical peripheral wall 11 of the cylinder 1 by, for example, an ultrasonic sealing process to close the front opening 111 after filling of a hydraulic fluid in the cylinder 1 (see FIGS. 3 and 7).

The rear cap 3 is sealed to the cylindrical peripheral wall 11 of the cylinder 1 by, for example, an ultrasonic sealing process to close the rear opening 112, having a center axle hole 31 for the passing of the piston rod 4. The rear cap 3 is sealed to the cylinder 1 before filling of a hydraulic fluid (not shown) into the cylinder 1. After filling of the hydraulic fluid into the cylinder 1, the front cap 2 is sealed to the cylinder 1 to seal the hydraulic fluid in the cylinder 1.

The piston rod 4 has a rod body 41 inserted through the center axle hole 31 of the rear cap 3, and a pin 411 axially extending from one end, namely, the front end of the rod body 41 for the mounting of the rigid valve block 6 and the piston 5. The pin 411 has an annular locating groove 4111 extending around the periphery remote from the rod body 41. Further, a retainer 412 is fastened to the annular locating groove 4111 to secure the piston 5 to the pin 411.

The piston 5 is preferably molded from plastics, having an outer diameter slightly smaller than the inner diameter of the cylindrical peripheral wall 11 of the cylinder 1. Further, the piston 5 has a center pivot hole 50 coupled to the pin 411 of the piston rod 4 for allowing movement of the piston 5 along the pin 411 between the retainer 412 and the rigid valve block 6, a plurality of through holes 51 axially extending through the front and rear sides and equiangularly spaced around the center pivot hole 50, a plurality of guide rods 52 axially extending from the rear side and respectively inserted into the rigid valve block 6 to guide axial movement of the piston 5, a plurality of slots 54 (see FIGS. 6 and 9) cut through the front and rear sides, and a plurality of spring strips 55 respectively suspending in the slots 54. The spring strips 55 each have a raised portion 551 protruded from the free end.

The rigid valve block 6 has a center pivot hole 60 coupled to the pin 411 of the piston rod 4 for allowing movement of the rigid valve block 6 relative to the piston rod 4. The rigid valve block 6 has an outer diameter smaller than the inner diameter of the cylindrical peripheral wall 11 of the cylinder 1. Therefore, a gap is left between the inner surface of the cylindrical peripheral wall 11 of the cylinder 1 and the periphery of the rigid valve block 6 after installation of the rigid valve block 6 in the piston rod 4. The rigid valve block 6 further has a plurality of axially extending guide grooves 61 that receive the guide rods 52 of the piston 5, and a plurality of through holes 62 axially extending through the front and rear sides (see FIGS. 1 and 6). The through holes 62 of the rigid valve block 6 are respectively aimed at some of the through holes 51 of the piston 5, i.e., the number of the through holes 62 of the rigid valve block 6 is less than the number of the through holes 51 of the piston 5.

When the piston rod 4 is extended out of the cylindrical peripheral wall 11 of the cylinder 1, the piston 5 is forced by the damping force of the hydraulic fluid in the cylinder 1 to move forwards along the pin 411 toward the retainer 412 and is then stopped at the retainer 412. At this time, the raised portions 551 of the spring strips 55 of the piston 5 are pressed on the rigid valve block 6, leaving a gap between the rigid valve block 6 and the rear side 53 of the piston 5 (see FIG. 5). At the same time, the hydraulic fluid flows through the through holes 62 of the rigid valve block 6 and the gap between the rigid valve block 6 and the inside wall of the cylindrical peripheral wall 11 of the cylinder 1 and then the through holes 51 of the piston 5 toward the front side (end) of the cylinder 1, and therefore the piston rod 4 with the piston 5 and the rigid valve block 6 are moved backwards at a high speed without much resistance. When the piston rod 4 is moved toward the inside of the cylindrical peripheral wall 11 of the cylinder 1, the piston 5 bears the pressure of the hydraulic fluid and is forced to stop against the front side of the rigid valve block 6, and at the same time the raised portions 551 of the spring strips 55 of the piston 5 are forced inwards toward the inside of the associating slots 54 (see FIG. 8), and therefore the piston rod 4 with the piston 5 and the rigid valve block 6 receive much resistance and are moved toward the inside of the cylinder 1 at a low speed, i.e., a buffering effect is produced to lower the speed of the return stroke of the piston rod 4 and the piston 5. When the piston rod 4 is received in the cylinder 1 and the spring power of the spring strips 55 of the piston 5 surpasses the resisting force at the piston 5, the spring strips 55 immediately return to their former shape, and therefore the raised portions 551 of the spring strips 55 are kept suspending out of the rear side 53 of the piston 5, leaving a gap between the rigid valve block 6 and the rear side 53 of the piston 5 (see FIG. 6). Therefore, the piston rod 4 with the piston 5 and the rigid valve block 6 can be moved backwards at a high speed without much resistance, i.e., the piston rod 4 can be extended out of the cylinder 1 at a high speed and received inside the cylinder 1 at a low speed. In an application example of the present invention, the cylinder 1 is affixed to the outer sliding rail of a sliding track assembly at one side of a sliding box in a furniture (not shown) and the rear end 44 of the piston rod 4 is coupled to the inner sliding rail of the sliding track assembly. When the user opens the sliding box, the piston rod 4 is moved with the sliding track assembly toward the outside of the furniture at a high speed without much resistance. On the contrary, when the user pushes the sliding box backwards toward the inside of the furniture, the piston rod 4 receives much damping resistance from the hydraulic fluid that acts upon the piston 5 and the rigid valve block 6, buffering the backward motion of the sliding box.

Further, the through holes 62 of the rigid valve block 6 have a diameter gradually increasing in direction from the front side of the rigid valve block 6 toward the rear side of the rigid valve block 6. Therefore, the hydraulic fluid receives less resistance when it flows through the through holes 62 of the rigid valve block 6 in direction from the front side of the rigid valve block 6 toward the rear side of the rigid valve block 6; the hydraulic fluid receives much resistance when it flows through the through holes 62 of the rigid valve block 6 in direction from the rear side of the rigid valve block 6 toward the front side of the rigid valve block 6.

Further, the rear cap 3 has an accommodation open chamber 32 defined on the inside in communication with the center axle hole 31 for accommodating a gasket member 30. The gasket member 30 has a center through hole 301 in axial alignment with the center axle hole 31 of the rear cap 3 for the passing of the rod body 41 of the piston rod 4. The rear cap 3 further has an annular locating groove 33 extending around the inside wall thereof in the open side of the accommodation open chamber 32 for the mounting of a locating plate 34 to hold down the gasket member 30 in the accommodation open chamber 32. The locating plate 34 is preferably molded from a rigid plastic material, having a front positioning portion 341 forced into engagement with a locating flange 37 of the rear cap 3, and a center through hole 342 in axial alignment with the center through hole 301 of the gasket member 30 and the center axle hole 31 of the rear cap 3 for the passing of the rod body 41 of the piston rod 4 (see FIG. 10).

Further, the cylinder 1 has a locating groove 113 extending around the inside wall near the rear opening 112 for the mounting of a cushion block 35. The cushion block 35 has a front side 351 stopped against an inner end edge of the locating groove 113 that is far from the rear opening 112, a rear side 352 disposed close to the end edge 36 of the rear cap 3, and a center through hole 353 for the passing of the rod body 41 of the piston rod 4. The cushion block 35 can be made out of sponge, rubber, or any suitable flexible material. Therefore, when the rigid valve block 6 is moved with the piston rod 4 toward the rear opening 112 of the cylinder 1 during forward stroke of the piston rod 4 at a high speed, the rigid valve block 6 will be forced against the cushion block 35, causing the cushion block 35 to be compressed. When the cushion block 35 is compressed as the piston rod 4 is extended out of the cylinder 1, the cushion block 35 absorbs shocks, thereby reducing noise.

As stated above, the invention provides a hydraulic damper for drawer that has the following features and advantages:

1. A high damping resistance is given to the piston 5 when the piston 5 is moved with piston rod 4 inwardly toward the inside of the cylinder 1, smoothening the return stroke of the piston rod 4.

2. The piston rod 4 receives less resistance when it is moved with the piston 5 toward the outside of the cylinder 1, and therefore the piston rod 4 can be extended out of the cylinder 1 at a high speed. Further, the cushion block 35 buffers the impact to lower the noise level when the piston rod 4 is extended out of the cylinder 1 at a high speed.

3. The piston 5 has a plurality of spring strips 55. When the resisting force received by the piston 5 is smaller than the spring power of the spring strips 55 during return stroke of the piston 5, the spring strips 55 immediately return to their former shape to suspend the raised portions 551 out of the rear side of the piston 5 and to keep the piston 5 apart from the rigid valve block 6 for enabling the piston rod 4 to be further extended out of the cylinder 1 at a high speed with less resistance.

What is claimed is:

1. A hydraulic damper comprising:
   a cylinder, said cylinder having a front opening in a front end thereof and a rear opening in a rear end thereof;
   a front cap sealed to the front opening of said cylinder;
   a rear cap sealed to the rear opening of said cylinder, said rear cap having a center axle hole
   a hydraulic fluid filled in said cylinder;
   a piston rod, said piston rod having a rod body inserted through the center axle hole of said rear cap and extending out of said cylinder, a pin axially extending from one end of said rod body and suspending inside said cylinder, and a retainer affixed to said pin remote from said rod body;
   a rigid valve block coupled to said pin and stopped against one end of said rod body of said piston rod, said rigid valve block having a diameter smaller than the inner diameter of said cylinder and a plurality of through holes axially extending through front and rear sides thereof; and
   a piston molded from plastics and mounted on said pin and axially movable along said pin between said retainer and said rigid valve block, said piston having an outer diameter smaller than the inner diameter of said cylinder, a plurality of through holes and slots axially extending through front and rear sides thereof, a plurality of spring strips respectively suspending in said slots, said spring strips each having a free end and a raised portion protruded from said free end suspended to extend out of said piston toward said rigid valve block and be stopped against said rigid valve block.

2. The hydraulic damper as claimed in claim 1, wherein said pin of said piston rod has an annular locating groove extending around the periphery thereof for the mounting of said retainer.

3. The hydraulic damper as claimed in claim 1, wherein said piston has a plurality of guide rods perpendicularly extending from the rear side; said rigid valve block has a plurality of guide grooves for receiving the guide rods of said piston to guide reciprocating motion of said piston along said pin.

4. The hydraulic damper as claimed in claim 1, wherein the number of the through holes of said piston is greater than the number of the through holes of said rigid valve block, and a number of the through holes of said piston are respectively aimed at the through holes of said rigid valve block.

5. The hydraulic damper as claimed in claim 1, wherein said rear cap comprises an accommodation open chamber, a center axle hole for the passing of said rod body of said piston rod, and a gasket member fitted into said accommodation open chamber, said gasket member having a center through hole for the passing of said rod body of said piston rod.

6. The hydraulic damper as claimed in claim 5, wherein said rear cap further comprises a locating flange disposed in an open side of said accommodation open chamber, an annular locating groove extending inside said locating flange, and a locating plate fastened to the annular locating groove of said rear cap to hold down said gasket member in said accommodation open chamber, said locating plate having a front positioning portion forced into engagement with said locating flange of said rear cap, and a center through hole for the passing of said rod body of said piston rod.

7. The hydraulic damper as claimed in claim 1, wherein said cylinder comprises a locating groove extending around an inside wall thereof near said rear opening, and a cushion block mounted in the locating groove of said cylinder for stopping against said rigid valve block to buffer the impact when said piston rod is moved out of said cylinder, said cushion block having a front side stopped against an inner end edge of the locating groove of said cylinder, a rear side disposed in proximity to said rear cap, and a center through hole for the passing of said rod body of said piston rod.

8. The hydraulic damper as claimed in claim 7, wherein said cushion block is made out one of the materials of sponge and rubber.

* * * * *